F. CANNON.
LOCOMOTIVE DRIVING BOX.
APPLICATION FILED JUNE 18, 1920.

1,384,381.

Patented July 12, 1921
2 SHEETS—SHEET 1.

WITNESSES
R. E. Rousseau

INVENTOR
Felix Cannon,
BY
ATTORNEYS

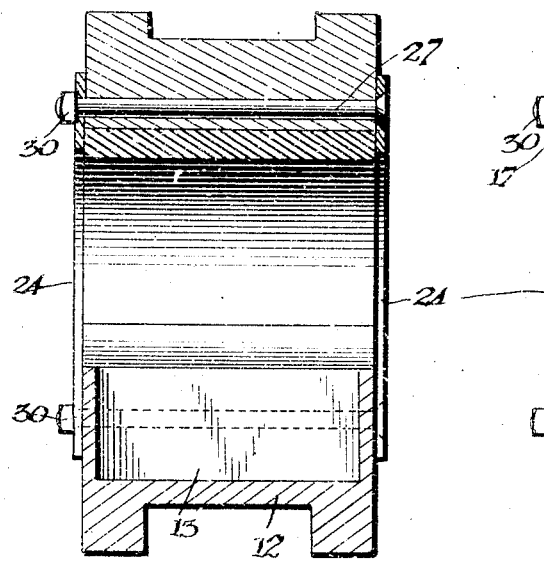
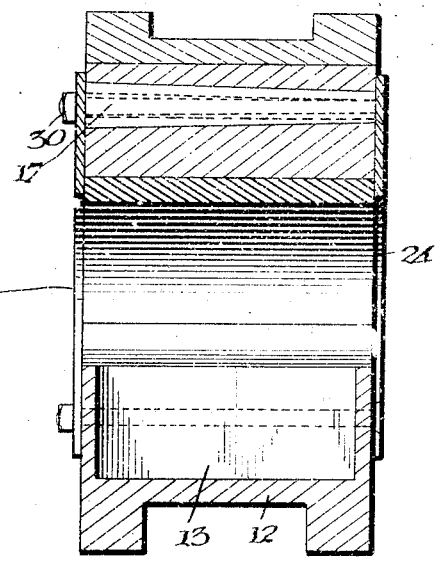
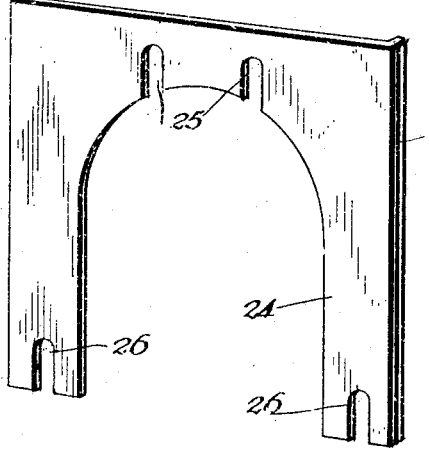
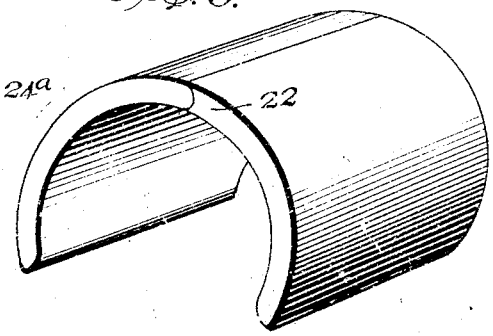

UNITED STATES PATENT OFFICE.

FELIX CANNON, OF HAMLET, NORTH CAROLINA.

LOCOMOTIVE DRIVING-BOX.

1,384,381. Specification of Letters Patent. Patented July 12, 1921.

Application filed June 18, 1920. Serial No. 389,866.

*To all whom it may concern:*

Be it known that I, FELIX CANNON, a citizen of the United States, and a resident of Hamlet, in the county of Richmond and State of North Carolina, have invented certain new and useful Improvements in Locomotive Driving-Boxes, of which the following is a specification.

My present invention relates generally to locomotive driving boxes, and more particularly to an improved driving box having for its primary object the support of a bearing brass in such manner and of such nature as to greatly outlast the usual bearing brass and render more efficient and effective service throughout its life.

A further object is the provision of a locomotive driving box which will be stronger and more durable than the usual box and which will permit of renewal of the bearing brass in much less time and with much less trouble than is now encountered.

The usual locomotive driving box is of inverted U-form with a separate piece forming the lubricant cellar and embodies a bearing brass which ordinarily surrounds the shaft journal for but one half of its circumference, with its ends insecurely supported in any event within the side walls of the box.

According to my invention I reverse this arrangement by forming the box of U-form with a lower integral base having a lubricant cellar, and I employ an upper saddle which connects the upper free ends of the box side walls in such manner as to rigidly space, connect and reinforce the same, the said saddle and the box side walls coöperating in the support of the brass in such manner that the saddle may be readily removed to permit of renewal of the brass though normally held in an effective manner against accidental displacement.

Figure 1:
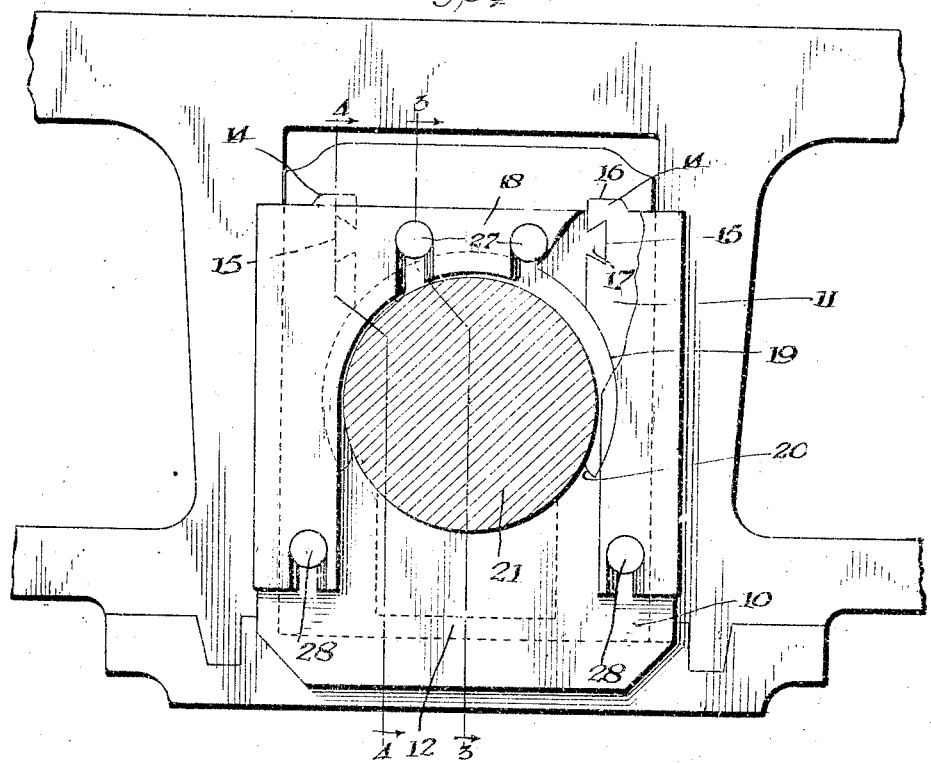
Figure 2:
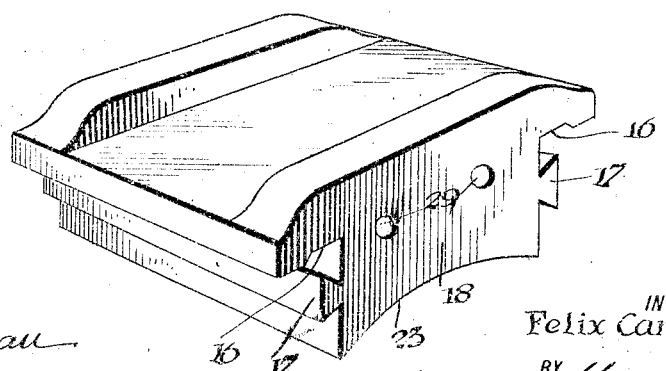

In the accompanying drawings illustrating my invention and forming a part of this specification, Figure 1 is a sectional side elevation showing my improvements, and with the adjacent renewable wear plate partly broken away, Fig. 2 is a detail perspective view of the saddle removed, Figs. 3 and 4 are vertical sections through the driving box taken respectively on lines 3—3 and 4—4 of Fig. 1, Fig. 5 is a detail perspective view of one of the renewable wear plates, and Fig. 6 is a similar view of the bearing brass.

Referring now to these figures my invention proposes a locomotive driving box generally indicated at 10, and of U-form with its bearing receiving aperture opening upwardly between the upper ends of its side walls 11 and with an integral base 12, the latter of which has a lubricant cellar 13 as clearly indicated in Figs. 3 and 4.

Transversely across the inner portions of the upper edges of the side walls 11 are ribs 14, and these side walls have inner transverse dove tailed grooves 15 which taper from the inner to the outer side of the box as clearly seen in Fig. 4. These ribs 14 and grooves 15 respectively coöperate with the downwardly opening grooves 16 and dove tailed tapering side ribs 17 of a saddle 18 which extends between the upper free ends of the side walls of the driving box and thus rigidly spaces and connects the same in such manner as to form an effective efficient reinforcement.

Below these grooves 15, the side walls 11 of the driving box have concavely curved recesses 19 terminating at their lower ends in shoulders 20, the latter of which are below the horizontal plane of the axis of the shaft journal 21, though well above the lubricant cellar of the base portion 12 of the driving box so that ample thickness of material remains for the support of the lower edges of the bearing brass 22 which abut the shoulders 20.

The brass receiving and supporting cavities 19 of the box side walls coöperate with the lower concave surface 23 of the saddle 18 in the effective support of the brass, which is placed in position before lengthwise shifting of the saddle 18 into place in a direction laterally of the driving box from its inner toward its outer face with which the corresponding faces of the saddle aline in the seated position of the latter as shown particularly in Figs. 3 and 4.

In the present construction the lateral motion or renewable wear plates 24 at opposite sides of the driving box 10, each of the inverted U-shape shown particularly in Fig. 5, serve the additional function of holding the saddle 18 effectively in place and against lateral displacement in the operative position of the parts, the upper portion of each lateral motion or wear plate 24 having vertical slots 25 at opposite sides of the center thereof, and the lower portions of the extensions having similar slots 26. The slots 25 and 26 respectively receive connecting bolts 27 and 28, the former extending through openings 29 of the saddle 18, and the latter extending through openings in the lower portions of the side walls of the driving box 10 at opposite sides of its base 12 and its lubricant cellar 13. The heads of the bolts 27 and 28 are counter-sunk in the wear plate 24 at the outer side of the box, by virtue of beveled edges of the slots 25 and 26 as seen in Fig. 1 and nuts 30 engage the inner ends of the bolts so that upon removal of the wear plates vertically the saddle 18 may be readily removed for renewing the bearing brass 22 without taking down the driving wheels and by simply loosening the nuts 30, liners (not shown) and of any suitable well known character may be readily inserted between the side faces of the box and the lateral motion or wear plates 24.

I also prefer to provide the wear plates 24 with side flanges 24ª which engage the sides of the driving box 10 and in this way take the major portion of the strain from the bolts 27 and 28.

My invention as thus constructed presents a stronger more lasting and durable construction than is used at present as well as one providing for much longer life of the bearing brass as well as its ready renewal when this becomes necessary and is such as to effect a great saving in both material and labor as well as the elimination of the frequent shop repairs to locomotives employing the present type of driving boxes.

I claim:

1. A locomotive driving box of U-shape having a lower integral portion provided with a lubricant cellar, and a laterally shiftable and detachable locking saddle connecting and reinforcing the upper portions of the side walls of the box.

2. A locomotive driving box of U-shape having a lower integral base portion between its side walls provided with a lubricant cellar, and a laterally shiftable and detachable saddle between and connecting the upper portions of the side walls, the said side walls and saddle coöperating in the support of a bearing brass.

3. A locomotive driving box of U-shape including side walls and a lower integral base portion having a lubricant cellar, said side walls having inner concave recesses and shoulders at the lower portions of the recesses spaced from opposite sides of the lubricant cellar, a bearing brass having its side portions disposed in the said recesses and its lower edges engaging the said shoulders, and a saddle between and connecting the upper ends of the side walls having a lower concave surface engaging the bearing brass.

4. A locomotive driving box of U-shape having side walls and an integral base portion provided with a lubricant cellar, the side walls having upstanding ribs at their upper ends and tapering dove tailed grooves upon their inner faces adjacent to the ribs, and a saddle having downwardly opening grooves receiving the said ribs and having a portion extending between the side walls and provided with tapering dove tailed ribs extending within the dove tailed grooves of the side wall as described.

5. A locomotive driving box of U-shape having side walls and an integral base, and a saddle rigidly spacing and connecting the upper ends of the side walls, said saddle and said side walls having interlocking connections relatively engageable by lateral shifting movement of the saddle with respect to the side walls of the box.

6. A locomotive driving box of U-shape having side walls and an integral base, and a saddle rigidly spacing and connecting the upper ends of the side walls, said saddle and said side walls having interlocking connections relatively engageable by lateral shifting movement of the saddle with respect to the side walls of the box, and wear plates at opposite sides of and removably connected to the box and having portions overlapping the opposite faces of the saddle and connected to the latter.

7. A locomotive driving box of U-shape having side walls and an integral base, and a saddle rigidly spacing and connecting the upper ends of the side walls, said saddle and said side walls having interlocking connections relatively engageable by lateral shifting movement of the saddle with respect to the side walls of the box, and wear plates at opposite sides of the driving box connected to the latter and to the saddle to normally hold the latter against displacement.

8. A locomotive driving box of U-form having side walls and an integral base connecting the lower portions of the side walls and provided with a lubricant cellar, and a laterally displaceable member paralleling said base and having interlocking connection with the upper inner portions of the side walls and bracing and rigidly connecting the same as described.

9. A locomotive driving box of U-form having side walls and an integral base connecting the lower portions of the side walls and provided with a lubricant cellar, and a laterally displaceable member having interlocking connection with the upper portions of the side walls and bracing and rigidly connecting the same, and wear plates removably disposed at opposite sides of the box and normally preventing displacement of said member.

10. A locomotive driving box of U-form having side walls and an integral base connecting the lower portions of the side walls and provided with a lubricant cellar, a laterally displaceable member having interlocking connection with the upper portions of the side walls and bracing and rigidly connecting the same, wear plates removably disposed at opposite sides of the box and normally preventing displacement of said member, bolts extending through the wear plates and through said member and also through the driving box, and flanges along the sides of the wear plates engaging the sides of the driving box as described.

FELIX CANNON.